United States Patent [19]

Mitzel et al.

[11] Patent Number: 4,583,398

[45] Date of Patent: Apr. 22, 1986

[54] APPARATUS FOR TESTING DATA CARRIERS

[75] Inventors: Wilhelm Mitzel, Neukeferloh; Alexander Serester, Munich, both of Fed. Rep. of Germany

[73] Assignee: GAO Gesellschaft für Automation und Organisation mbH, Fed. Rep. of Germany

[21] Appl. No.: 551,474

[22] Filed: Nov. 14, 1983

[30] Foreign Application Priority Data

Nov. 19, 1982 [DE] Fed. Rep. of Germany ....... 3242789

[51] Int. Cl.[4] .............................................. G01B 5/16

[52] U.S. Cl. ...................................... 73/156; 235/435

[58] Field of Search ......................... 73/156, 157, 159; 235/435, 436, 437, 438, 439, 440, 442, 474, 475, 476, 483, 484, 485, 486, 479, 447

[56] References Cited

U.S. PATENT DOCUMENTS

| | | | |
|---|---|---|---|
| 2,891,721 | 6/1939 | Chenus | 73/156 |
| 2,930,228 | 3/1960 | Lawrence et al. | 73/159 |
| 3,132,241 | 5/1964 | Wolfheimer | 235/447 |
| 4,031,359 | 6/1977 | Christou et al. | 235/475 |
| 4,040,097 | 8/1977 | Mizuno | 235/437 |
| 4,181,920 | 1/1980 | Cerekas | 235/475 |
| 4,224,508 | 9/1980 | Kao | 235/437 |
| 4,228,953 | 10/1980 | Ingram, Jr. et al. | 235/475 |

*Primary Examiner*—Charles Frankfort
*Assistant Examiner*—David R. Schuster
*Attorney, Agent, or Firm*—Andrus, Sceales, Starke & Sawall

[57] ABSTRACT

In a sorter for data carriers, in which the data carriers, for testing, run past an arrangement of sensors located on both sides of the transport path, at least the sensors on one side of the transport path are arranged on a separate mounting plate. This mounting plate is pivoted so that the sensors located opposite each other can be moved apart, thus exposing the transport path.

12 Claims, 2 Drawing Figures

APPARATUS FOR TESTING DATA CARRIERS

The invention relates to an apparatus for testing data carriers, in particular bank-notes, in which sensors are arranged on both sides along a transport path for testing various properties of the data carriers successively.

Testing devices or sensors of the above-mentioned type are used, for example, in so-called bank-note sorters in order to test the condition, the authenticity or other properties of bank-notes for sorting purposes. In order to be able to test various properties of the bank-notes on both sides by reflectance as well as transmission methods, it is necessary in many cases that the sensors each comprise two components arranged opposite each other on each side of a transport path. Depending on the method of measurement, the two components are operated jointly or separately from each other, extending as far as possible towards the transport path for constructional reasons as well as reasons of measuring technique. The two components are adjusted mechanically relative to the transport path in order to arrive at reproducible results. It is also necessary to protect at least those sensors which test the so-called authenticity features of banknotes, so as to prevent an unauthorized person from removing a sensor.

All the above-mentioned measures which are required to realize this kind of testing path necessarily involve disadvantages both in case of a disturbance and during routine servicing, since access to the transport path in the area of the sensors as well as to the sensors themselves is difficult, or even quite impossible in some cases. When the banknotes built up along the testing path, one or, in some cases, even more sensors had to be removed up to now in order to expose the transport path and free it from accumulated bank-notes. The removal of sensors which test authenticity features, for example, involves paying attention to extensive safety precautions. After the build-up is eliminated, the measuring devices must be adjusted when the sensors are reinserted, which is more or less troublesome and time-consuming depending on the type of sensor, and further delays the operation of the sorter. Similar problems crop up when the sensors must be cleaned or subjected to a test. In the latter case, it is also disadvantageous that the sensors, when they are removed, are no longer ready for operation or no longer operable under original conditions, due to the interruption in the supply of electricity. Depending on the particular measuring principle of the various sensors and thus depending as well on the particular adapting variant of the sorter, increased development of heat or protection against mechanical vibrations is also necessary in various parts of the sensor path. In order to guarantee perfect operation of the apparatus and prevent to a great extent any disturbances based on the development of heat and mechanical vibrations, often very elaborate additional measures were required up to now, even outside the sensor measuring path.

The object of the present invention is thus to provide an apparatus in which the sensors and the transport path may be exposed quickly and easily, allowing for the sensors to remain ready for operation in this state as well, and in which the negative mutual effect of sensors and adjacent functional units may be prevented to a great extent, as required.

The object is achieved by the features stated in the characterizing part of the main claim.

By arranging complete sensor groups on separate mounting plates which may be moved away as a whole from the transport level, the entire transport path can be exposed in a simple manner and an extremely short time. This greatly simplifies the removal of a bank-note build-up or the cleaning of the sensors. Since the sensors are firmly mounted on the mounting plate and need not be disassembled to expose the transport path, it is no longer necessary to temporarily deactivate any existing safety devices or readjust the sensors after eliminating a disturbance. It is also possible to test the sensors experimentally when the transport path is exposed, since the supply of electricity to the sensors is not interrupted. In an advantageous embodiment of the invention, the sensor components along with the mounting plate are decoupled from the rest of the system mechanically and thermally, thus allowing for the possibility of isolating the sensors to a great extent from mechanical vibrations (solid-borne sound) and providing local cooling adapted to the sensors.

Further features and advantages of the invention may be found in the subclaims and in the following description which deals with an embodiment of the invention with reference to the accompanying figures. These show:

Figure 1:
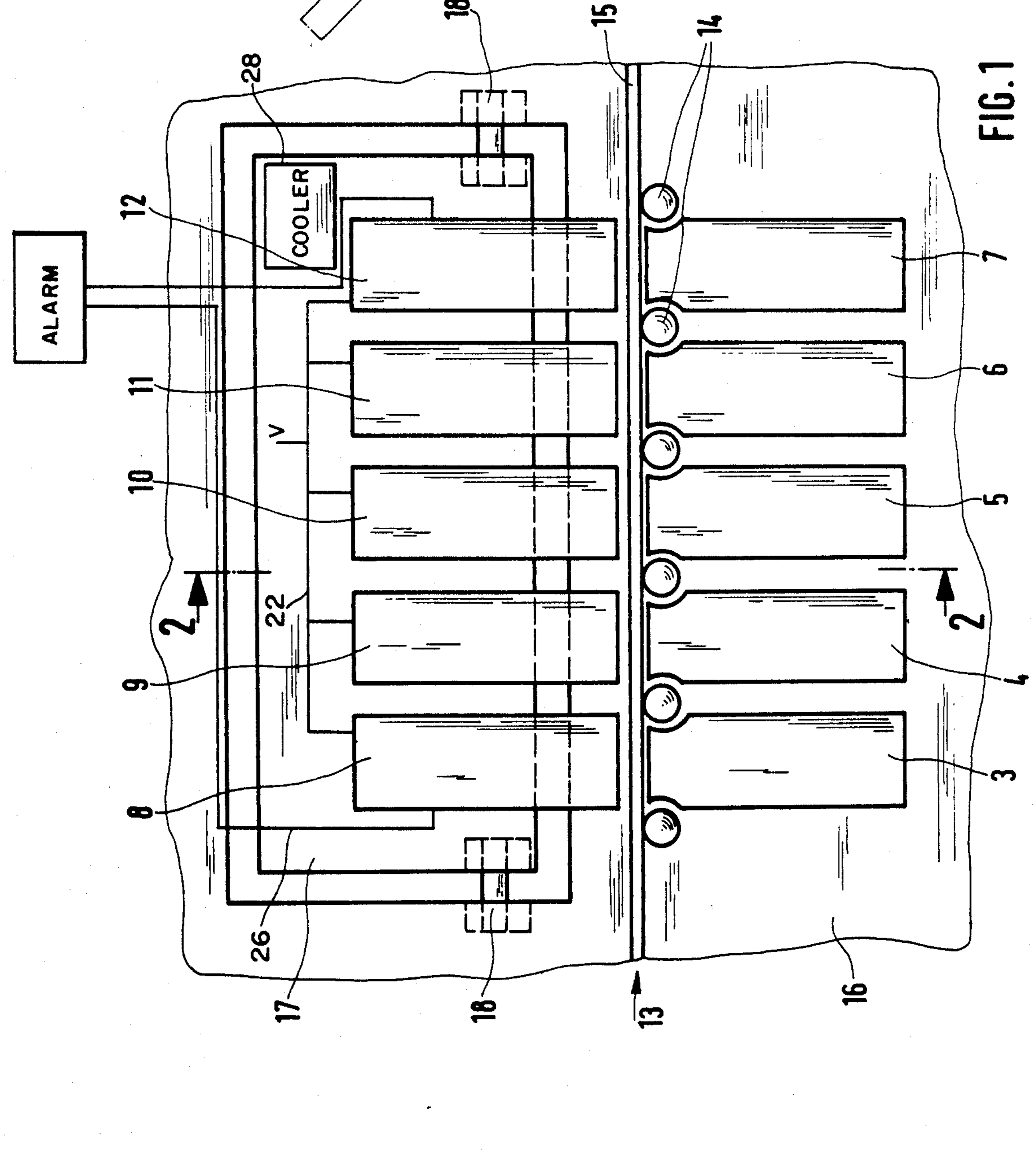
FIG. 1 is a top view of the testing path according to the invention.

FIG. 1 shows, in an exemplary embodiment, a section of a bank-note sorter in the area of the testing path. The bank-notes are led past the various sensors in sequence in the direction of arrow 13 by aid of a transport system comprising rollers 14 and belt 15. In the construction of a testing path as shown in FIG. 1, the sensors each consist of two subassemblies opposite each other and thus defining a narrow gap through which the bank-notes pass. Depending on how the subassemblies are equipped, they allow both for testing each side of the bank-notes and for irradiating them.

Figure 2:
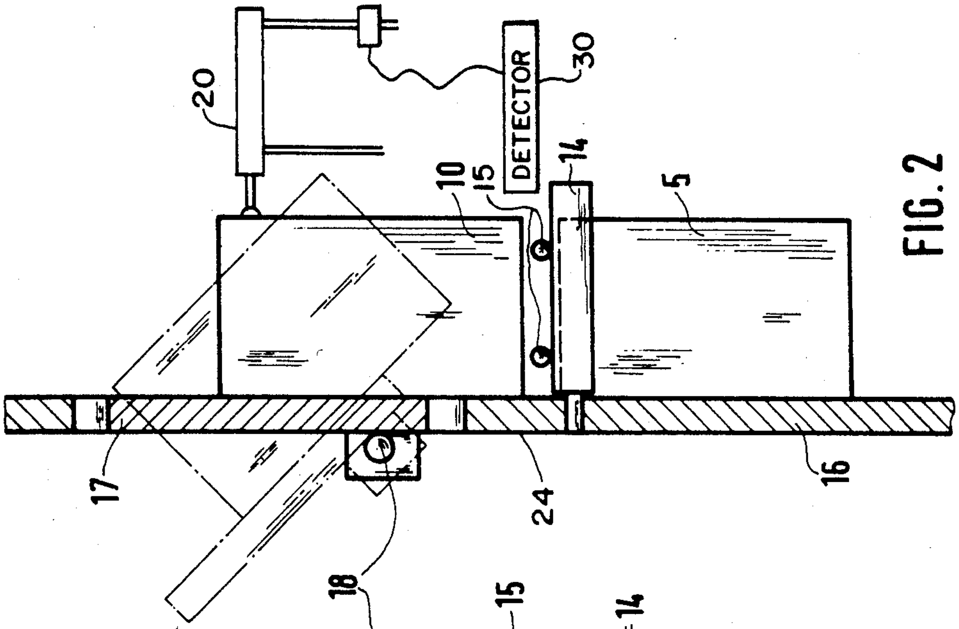
FIG. 2 is a cross-section along line 2—2 of FIG. 1.

As can be seen especially in FIG. 2, a cross-section view along line 2—2 of FIG. 1, subassemblies 8 to 12 shown in the drawing above the transport path are attached to a separate mounting plate 17. Transport elements 14 and the subassemblies 3 to 7 on the opposite side, however, are mounted on the general base plate 16 of the sorter. Mounting plate 17 is hinged via appropriate axles 18 to base plate 16 so that the plate bearing these subassemblies may be swivelled out of the plane of the base plate, as shown by the dotted lines in FIG. 2. This swivelling, which may be carried out manually or with appropriate additional means such as pneumatic or hydraulic components 20, opens up the gap formed by the measuring heads of the sensors and exposes the front sides of sensor subassemblies 8 to 12 and 3 to 7 facing the transport path, as well as the transport path itself. It is thus easy to remove a bank-note build-up or clean the fronts of the sensors.

An essential property of the invention is that the exposure of the transport path leads neither to an interruption of the electrical supply 22 nor to disadjustment of the sensors. The sensors may thus also be subjected to testing when the sensor path is opened up, and need not be readjusted after a build-up has been eliminated, for example, or dirt has been removed. Readjusting the sensors, which was necessary in conventional devices after every local change in a sensor, may be very troublesome in those instances when several sensor components form one unit on each side of the transport path for testing certain properties, and the exact geometrical position of the various components relative to each other is crucial for their functioning.

The geometrical constellation of the sensor components united on the mounting plate is maintained due to the joint movement of the sensors and the plate in the inventive apparatus. Furthermore, when the mounting plate has been moved back into its original position, the sensors are guaranteed to resume their prescribed position relative to the subassemblies on the opposite side as shown in FIG. 2 by plate portion 24.

The inventive solution also contributes to improving the protection of the sensors against unauthorized removal.

In conventional devices, it was necessary up to now, as mentioned above, to remove particular sensors from the device in order to remove build-ups in the sensor area, for example, or to clean the sensors. Since the sensors responsible for testing authenticity are in particular subject to strict safety conditions according to which the sensors may only be removed using such precautions as requiring a witness or putting it on the record, a fair amount of organizational or administrative effort was required to eliminate errors up to now, even on relatively trivial occasions and in addition to the necessary technical measures (adjustment, etc.).

In a development of the invention, so-called "safety loops 26" connected to an alarm are provided to prevent the unnoticed removal of a sensor. The safety loop 26 is realized, in the most simple case, in the form of an electric circuit in which the various sensors are series-connected in a non-shortable manner, e.g. by supply lines or plug connections not accessible from the outside. The circuit is interrupted and the alarm triggered when a sensor is removed. The electrical alarm loop is furthermore designed according to the invention in such a way that the removal of the sensor subassembly from the transport plane not only maintains the general electrical functions but also fails to make the power supply, plug connections, etc. accessible or cause any interruption or triggering of the alarm.

By maintaining the electrical and mechanical interfaces the inventive design provides the possibility of protecting the sensors against unauthorized removal even during intervention, thus considerably reducing the safety requirements, since the safety elements for the sensors remain untouched even during and after removal of the mounting plate from the transport plane. This considerably reduces the staff and time necessary to remove a bank-note build-up or to clean the sensors.

A further essential property of the inventive apparatus is the possibility of mechanically and thermally decoupling the sensor subassemblies from the entire system. Thermal decoupling—possibly in combination with additional cooling means 28 on the mounting plate—makes it easier to maintain the necessary operating temperature of the subassemblies, whereas mechanical decoupling prevents vibrations caused, for example, by drive units from being transmitted to the subassemblies. The decoupling of sensor subassemblies from the entire system, or only of particular sensor subassemblies, for example, also allows optimal operating conditions to be provided to certain sensor components selectively and according to individual needs.

Sorters which are to be equipped with different types of sensors to adapt to different types of bank-notes can now be provided relatively easily with sensor mounting plates equipped in different ways. The mounting plates may bear the cooling means 28 required for the particular set of sensors mounted on them, thus allowing not only for increased ease of servicing and repair, but also for much easier adaptation of the standard device to different applications.

In the inventive apparatus, other elements of the sorter may also be arranged on the mounting plate along with the sensors, cooling means, etc. It may prove advantageous in the case of certain transport systems to allow for complete exposure of the transport path by mounting transport elements such as guide rails or path limiting areas on the mounting plate.

In the embodiment shown, only the subassemblies on one side of the transport path are attached to a mobile plate. The subassemblies may also be arranged on each side of the transport path on mobile plates, however.

It is also possible in the interests of optimizing the inventive aspects to provide several mounting plates, only some of which are arranged mobilely, or several mobile mounting plates each bearing only some of the sensors or groups of sensors. The latter variant proves advantageous when, for example, special conditions are required by particular sensor subassemblies involving, for example, different operating temperatures or special safety precautions. This specific embodiment is also advantageous in that when intervention is necessary it may be restricted to the particular local area involved.

The inventive apparatus also offers several possibilities for mounting the mounting plate in the overall device and for its manner of movement to open up the sensor path. The mounting of mounting plate on axles 18 shared with the base plate and the resulting swiveling movement has already been described with reference to the figures. The same result may also be obtained with other hinging means.

In a further embodiment, the mounting plate can be swiveled out of the plane of the base plate by means of an appropriate lever system, or the mounting plate is connected with the base plate by rails and may be displaced on them to open up the sensor path.

In the above-mentioned embodiments, means 24 are provided to return the mounting plate to its basic position after it has been moved away so that the various sensors automatically resume the precisely adjusted position relative to each other as required for operation.

The precise positioning of the mounting plate in its operational position is carried out by locking elements which are either mechanical or operate on an electrical basis, such as mechanical stops 24 or driving means which may be controlled by position relayers. The mounting plate may either be locked in its operational position by the locking elements themselves or by additional elements of the apparatus, thus fixing the exact positioning of the sensors.

The mounting plates are preferably moved by means of motor operators, power hydraulics or power pneumatic devices. Thus the opening of the transport path may also take place automatically and be brought about automatically. For example, when appropriate detectors 30 recognize a bank-note build-up a signal is produced to initiate the immediate opening of the transport path due to the mounting plates moving away. The quick access made possible in this manner leads to a considerable reduction in the time required to remove a bank-note build-up.

The standardization of the outer dimensions and of the electrical and mechanical interfaces provides a prerequisite for equipping the testing equipment with various sensors to conform with different requirements, and for switching the places of the sensors, always maintaining the compact arrangement of the sensors on the mobile mounting plates.

We claim:

1. Apparatus for testing data carriers, such as banknotes, comprising:

means (14, 15) for defining a transport path for the data carriers through said apparatus;

a base plate (16) arranged normal to said transport path for mounting a first plurality of sensors (3–7) closely adjacent one side of said transport path, said sensor sensing properties of the data carriers;

a mounting plate (17) for mounting a second plurality of sensors (8–12) for sensing properties of the data carriers, said mounting plate and second plurality of sensors forming an assemblage, said mounting plate having a first position in which said second plurality of sensors are arranged closely adjacent to the other side of said transport path and bear a predetermined positional relationship to said first plurality of sensors so that said first and second pluralities of sensors oppose each other and define a narrow gap through which the data carriers pass along said transport path, said mounting plate being movable to a second position in which said second plurality of sensors is removed from said first plurality to open said gap; and means (24) engaging said mounting plate-second sensor plurality assemblage for reestablishing said predetermined positional relationship with said first plurality of sensors when said mounting plate returns to said first position from said second position.

2. The apparatus according to claim 1 further characterized in that said mounting plate can be locked in said first position.

3. The apparatus according to claim 1 wherein at least said second plurality of sensors have an electrical power supply (22) and wherein said mounting plate-second sensor plurality assemblage is further defined as movable so as to retain the connection of said sensors to said electrical power supply (22).

4. The apparatus according to claim 1 wherein said second plurality of sensors are provided with safety devices (26) to indicate the removal of a sensor from said mounting plate.

5. The apparatus according to claim 1 wherein said mounting plate is arranged in said apparatus with respect to said base plate in a manner such that heat transfer and the transmission of vibrations from said base plate to said mounting plate are reduced.

6. The apparatus according to claim 1 wherein transport elements for said data carriers are arranged on said mounting plate.

7. The apparatus according to claim 1 wherein cooling means (28) is arranged on said mounting plate.

8. The apparatus according to claim 1 wherein said mounting plate is movably mounted in said apparatus by at least one of hinges, rails, and lever systems.

9. The apparatus according to claim 8 wherein said mounting plate is movably mounted in said apparatus by means of a hinge, the hinge axis (18) of which lies parallel to said transport path.

10. The apparatus according to claim 2 further including means (20) for moving said mounting plate.

11. The apparatus according to claim 10 wherein said movement means comprises one of a hydraulic and pneumatic cylinder.

12. The apparatus according to claim 2 including means (30) responsive to conditions in said transport path for initiating the movement of said mounting plate to said second position.

* * * * *